T. STROBRIDGE.

COFFEE-MILL.

No. 7,174. Reissued June 13, 1876.

Witnesses.

R. C. Wrenshall

James L. Kray

Inventor.

Turner Strobridge by Bakewell & Stern

Attorneys

N. PETERS, PHOTO-LITHOGRAPHER, WASHINGTON, D. C.

UNITED STATES PATENT OFFICE

TURNER STROBRIDGE, OF NEW BRIGHTON, PENNSYLVANIA.

IMPROVEMENT IN COFFEE-MILLS.

Specification forming part of Letters Patent No. 159,467, dated February 2, 1875; reissue No. 7,174, dated June 13, 1876; application filed May 24, 1876.

*To all whom it may concern:*

Be it known that I, TURNER STROBRIDGE, of New Brighton, in the county of Beaver and State of Pennsylvania, have invented a new and useful Improvement in Coffee-Mills; and I do hereby declare the following to be a full, clear, and exact description thereof, reference being had to the accompanying drawing, forming a part of this specification, in which—

Figure 1:
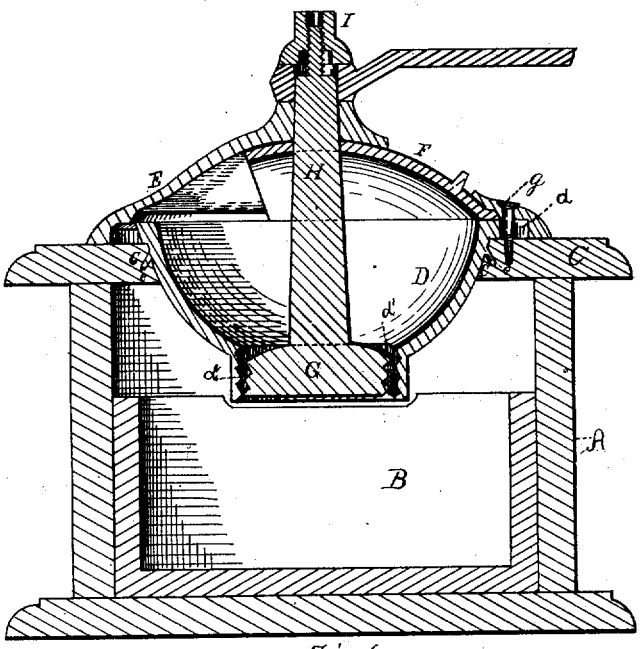
Figure 2:
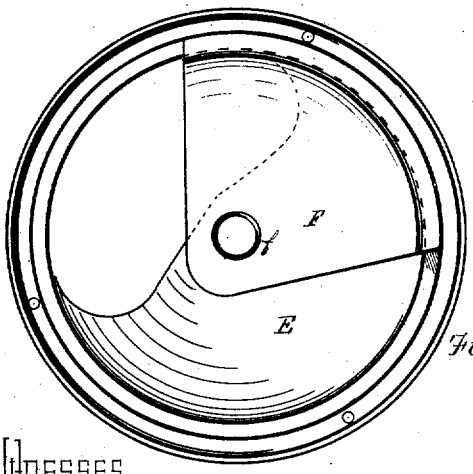
Figure 3:
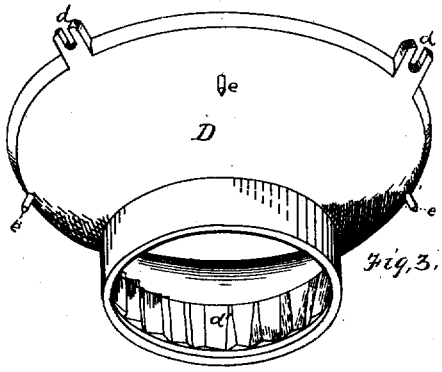

Figure 1 is a vertical section of a coffee-mill embodying my invention. Fig. 2 is an under view of the cover, and Fig. 3 is a perspective view of the hopper.

Like letters refer to like parts whenever they occur.

My invention relates to the construction of coffee or spice grinders; and it consists in suspending the hopper within the box by means of a flange or projections resting on the top of the box; also, in the combination of a hopper, suspended from the top of the box, and a cover; also, in securing a covered suspended hopper in position by means of screws, which pass through the cover, and through lugs or a projecting flange upon the hopper, whereby the construction and attachment of the devices are simplified; also, in providing the covered hopper with a sliding or movable gate, centered with the shank of the grinding-nut, and sliding upon the periphery or flange of the hopper, whereby hinges, springs, or catches are dispensed with, and the gate slides aside, leaving an unobstructed opening for the admission of the article to be ground; and, also, in providing the hopper with projections or points, which bite into the cover of the box, and prevent the slipping or turning of the hopper, in connection with a cover projecting so as to rest upon the top of the box, and bind upon the upper edge of the hopper.

I will now proceed to describe my invention with reference to the accompanying drawing, so that others skilled in the art may construct and use the same.

A indicates the box, with its drawer B, of any suitable construction. The top C of the box is cut away for the admission of the hopper, which I introduce from above, suspending it in the box by means of a projecting flange or lugs on the hopper; and to facilitate the suspension of the hopper I preferably bevel the opening in top C to correspond with the curve of the hopper, as shown at *c*. This also will diminish the liability of the splitting of the wood when the screws which secure the cover are introduced, (when a cover is used and secured as shown.) D represents the hopper or grinding-shell, provided with a flange or lugs, *d*, by which it is suspended upon the top C of the box A. The hopper is fastened down, and also prevented from turning, by the screws *g*. The hopper has the usual grinding-face *d'*, and a series of projections or points, *e*, which I provide for the purpose of taking hold upon the beveled edge *c* of the top C, to assist in preventing any movement of the hopper. The points, if sufficiently numerous, will of themselves prevent a change of position of the hopper. E is the cover, having a central opening for the passage of the shank of the grinding-nut, and a sunken or recessed rim for the accommodation of the lugs *d* or the flange of the hopper, so that the lower edge of the cover rests evenly upon the top C, and at the same time binds upon the hopper. This cover E is provided with a sliding gate or door, F, which is pierced, as at *f*, for the passage of, or made to rest against, the shank of the grinding-nut, upon which it turns or bears, said gate F resting, by its lower edge, upon the upper edge of the hopper, and sliding or moving within or without the cover E, so as to be out of the way when the opening in the cover is unclosed. G represents the grinding-nut, having a tapering shank, H, which passes through the cover, projecting portion of gate F, and the crank, and is secured above by the usual tightening-nut I.

The devices are put together as follows: The cover and gate are placed upon the hopper, the shank of the grinding-nut passed through the hopper, cover, and crank, and secured by the tightening-nut. The lugs or screw-openings in the flange of the hopper are made to register with those in the cover, after which the operative parts are dropped into the opening in the top of the box, and secured by a single set of screws, which pass through the cover and lugs or flange of the hopper. The projecting points on the outside of the hopper will bite into the top of the box, and as the cover binds upon the upper edge of the hopper these will, of themselves, if sufficiently numerous, be sufficient to prevent any movement of the hopper, so that, if desired, the screws need not pass through the flange of the hopper.

The hopper may be suspended, as shown, and the cover replaced by a bridge to support the shank of the grinding-nut. The grinding-shell or hopper and the cover may be secured by a separate set of screws. The lower part of the grinding-shell may be formed with lugs or projections to guide and steady the grinding-nut.

Among the advantages of my invention are the simplicity of construction, and the readiness with which the several parts and the box may be adjusted or set up, whereby time and labor are saved and a serviceable article produced.

Having thus described my invention, what I claim, and desire to secure by Letters Patent, is—

1. In coffee and spice mills, the combination of the box, having a top, with the hopper, suspended therein by means of a projecting flange or lugs, which rest upon or take into the top, substantially as described.

2. The combination of the box, having a top, with the hopper, suspended therein by means of a projecting flange or lugs, which rest upon or take into the top, and a cover, substantially as described.

3. The combination of cover E and grinding-shell or hopper D, the latter provided with lugs or a flange, so that the two parts may be secured to the box by a single set of screws, substantially as specified.

4. The hopper and grinding-shell D, provided with points or projections *e* on its outer surface, in combination with cover E, projecting so as to rest upon the top of the box, and bind upon the upper edge of the hopper, substantially as and for the purpose specified.

5. The combination of the hopper and grinding-shell D, grinding-nut G, having shank H, and cover E, having a sliding gate or door, F, substantially as and for the purpose specified.

In witness whereof I, the said TURNER STROBRIDGE, have hereunto set my hand.

TURNER STROBRIDGE.

Witnesses:

J. H. LOGAN,

R. C. WRENSHAW.